United States Patent [19]

Carter, Jr.

[11] Patent Number: 4,776,251
[45] Date of Patent: Oct. 11, 1988

[54] CIRCULAR SAW BLADE WITH CIRCUMFERENTALLY EXTENDING LASER-CUT SLOTS

[75] Inventor: Linwood I. Carter, Jr., Bowman, S.C.

[73] Assignee: Pacific Saw and Knife Company, Portland, Oreg.

[21] Appl. No.: 62,231

[22] Filed: Jun. 12, 1987

[51] Int. Cl.⁴ .................. B23D 57/00; B27B 13/02; B27B 33/14

[52] U.S. Cl. .................................................. 83/835

[58] Field of Search ............... 83/835, 836, 837, 838, 83/839, 840, 841, 848, 852

[56] References Cited

U.S. PATENT DOCUMENTS

| | | |
|---|---|---|
| 1,083,645 | 1/1914 | Wettstein . |
| 1,711,102 | 4/1929 | Sierra, Jr. . |
| 1,723,843 | 8/1929 | Chapin . |
| 1,861,218 | 5/1932 | Huther . |
| 2,013,943 | 9/1935 | Allen . |
| 2,256,847 | 9/1941 | Osenberg . |
| 3,199,171 | 8/1965 | Hellmann et al. . |
| 3,205,556 | 9/1965 | Romans . |
| 3,563,286 | 2/1971 | Strobel et al. . |
| 3,700,016 | 10/1972 | Strobel . |
| 3,820,419 | 6/1974 | McLagan . |
| 3,854,364 | 12/1974 | Sundstrom ............................ 83/835 |
| 3,872,763 | 3/1975 | Kayahara . |
| 3,964,348 | 6/1976 | Dawson . |
| 3,981,216 | 9/1976 | Lemmon . |
| 4,138,908 | 2/1979 | Kampmann et al. . |
| 4,240,315 | 12/1980 | Tuomaala . |
| 4,257,201 | 3/1981 | Tuomaala ............................. 83/835 |
| 4,513,742 | 4/1985 | Arnegger ............................. 83/835 |
| 4,574,676 | 3/1986 | Jansen-Herfeld . |
| 4,584,920 | 4/1986 | Jansen-herfeld . |

FOREIGN PATENT DOCUMENTS

| | | |
|---|---|---|
| G 15885 | 10/1954 | Fed. Rep. of Germany ........ 83/835 |
| 2654625 | 6/1978 | Fed. Rep. of Germany ........ 83/835 |

Primary Examiner—E. R. Kazenske
Assistant Examiner—Scott A. Smith
Attorney, Agent, or Firm—Klarquist, Sparkman, Campbell, Leigh & Whinston

[57] ABSTRACT

A circular saw blade is disclosed which includes a circular body having two side faces, a central bore, and a toothed peripheral edge. Disposed within the body of the saw blade is a plurality of circumferentially extending laser-cut slots. Each of the slots consists of an arc of a circle concentric with the body of the saw blade and parallel to the peripheral edge thereof. The slots extend through the body from one side face to the other, and are spaced in a manner such that each slot cools an area of the body when the saw blade is in operation.

3 Claims, 1 Drawing Sheet

CIRCULAR SAW BLADE WITH CIRCUMFERENTALLY EXTENDING LASER-CUT SLOTS

BACKGROUND OF THE INVENTION

This invention relates to circular saw blades and more particularly, to an improved circular saw blade provided with strain compensating, heat dissipating slots in the body thereof.

Circular saw blades have been made in the past with radially extending slots projecting outwardly of the central bore of the blades to compensate for various strains occurring in the blades during operation thereof. Specifically, such blades have been formed with slots cut in the body of the blade by laser cutting machines. A circular saw blade constructed in this manner is disclosed in Jansen-Herfeld U.S. Pat. No. 4,574,676.

The Jansen-Herfeld patent discloses a blade having a plurality of radially extending slots starting immediately at the central bore. In addition, a plurality of outer radial slots extend intermediate the central bore and the peripheral edge. Both sets of slots are spaced from each other in the circumferential direction and partially overlap each other in the radial direction. The Jansen-Herfeld saw, however, has experienced many difficulties. The radially extending slots become packed full of sawdust and also shave wood from lumber being sawn. The blades tend to rip sawguides. They are noisy, run hot, have a short life, crack easily and damage lumber and guides as aforesaid. The Jansen-Herfeld blade, however, hammers more easily than prior blades probably because of the presence of the slots.

It is thus a primary object of the present invention to provide a circular saw blade that will be easy to hammer, yet will run quieter, cooler, and longer than prior art blades, be harder to crack, resistant to sawdust packing in its slots, and not damage either lumber or guides.

It is a further object of the present invention to provide such a circular saw that will run in gap edges, whether guided or unguided, and remain strong in its mandrel or central bore area.

It is a still further object of the present invention to provide a circular saw blade of the above type with laser-cut slots disposed within the body thereof, which slots can compensate for strain, dissipate heat, not become packed with sawdust during operation and not damage either the lumber being cut or the guides in which it runs.

SUMMARY OF THE INVENTION

The aforementioned and other objects of the invention are achieved by my circular saw blade which typically comprises a circular body with two side faces, the body comprising a central bore and a toothed peripheral edge. Disposed within the body of the saw are a plurality of circumferentially extending laser-cut slots. Each of the slots consists of an arc of a circle concentric with the body of the saw and parallel to the peripheral edge thereof. The slots comprise no components in the radial direction of the saw.

Each of the slots extends through the body from one side face to the other. The slots are spaced in a manner such that each slot cools an area of the body when the saw blade is in operation.

DETAILED DESCRIPTION OF THE PREFERRED EMBODIMENT

Figure 1:
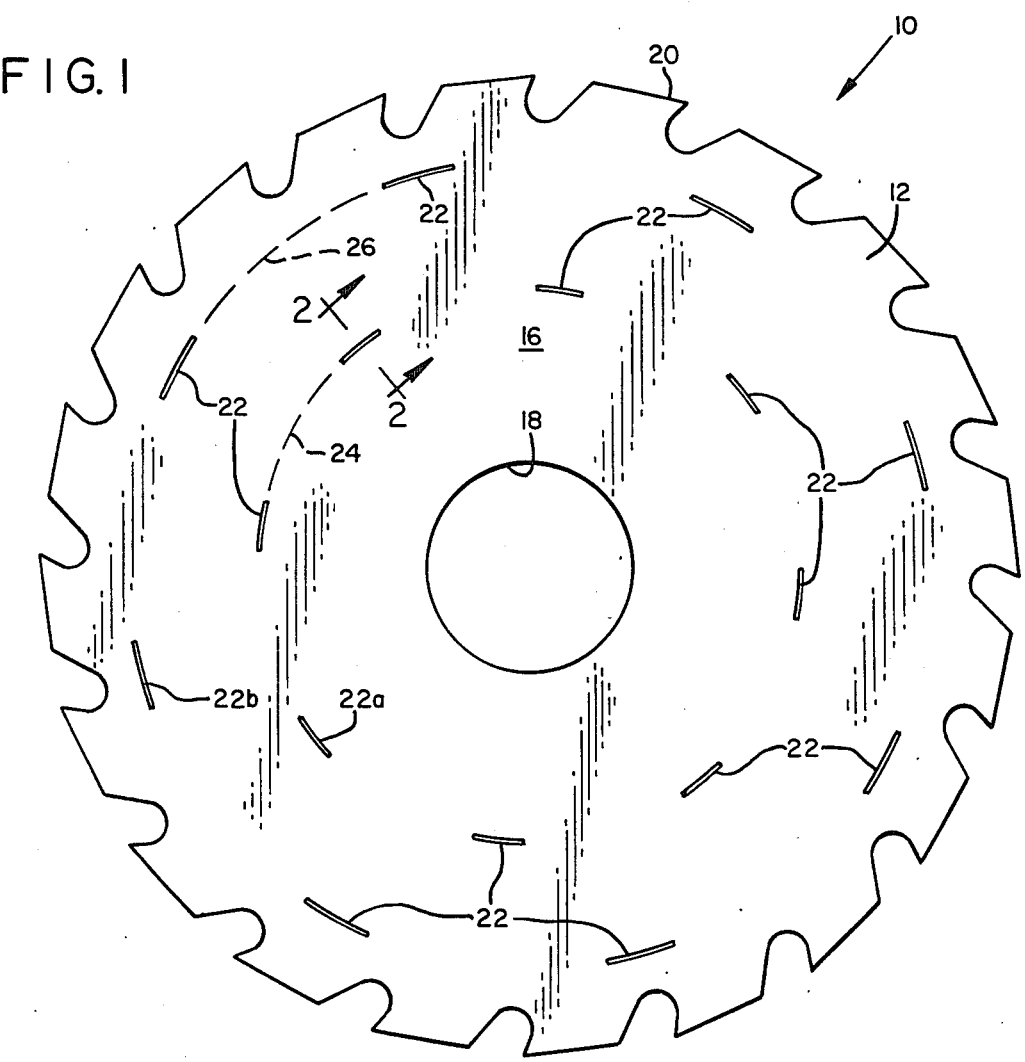
FIG. 1 is a side view of a circular saw blade according to the present invention.
Figure 2:
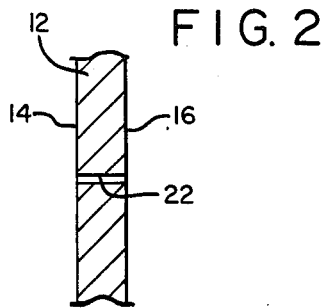
FIG. 2 is a partial sectional view on line 2—2 of FIG. 1.

Referring to the drawings, the saw blade 10 of the present invention has a circular body 12 with side faces 14, 16. The body includes the usual central bore 18 and has a toothed peripheral edge 20.

A plurality of circumferentially extending laser-cut slots 22 are disposed within the body 12. Each of the slots 22 consists of an arc of a circle concentric with the body and parallel to the peripheral edge 20 thereof. Each of the slots 22 extends through the body 12 from one side 14 to the other side 16. The slots 22 are spaced such that each slot cools an area of the body 12 when the saw blade is in operation.

A twenty-four inch circular saw blade according to my invention is shown in FIG. 1. It is preferably provided with slots 22 disposed along two circles 24, 26, each of which is concentric with the body 12 and parallel to the peripheral edge 20 thereof. The slots 22a located on circle 24 are 1.270 inches in length measured along the arc thereof. The circle 24 has a diameter of 14.5728 inches. The slots 22b disposed along circle 26 are 1.863 inches long measured along the arc thereof. The circle 26 has a diameter of 21.38 inches.

Slots 22 typically are cut between about 0.002 inch and 0.015 inch in width depending on the thickness of the blade. The slots are preferably cut by an industrial laser cutting machine, such as a Spectrophysics Model 820.

The slots 22 do not have to be disposed exclusively on one or even two circles. They can be offset radially from each other. They need only be evenly spaced such that each cools an area of the blade. They must, however, each consist of an arc of a circle concentric with the body of the saw blade and parallel to the peripheral edge thereof such that none has any component in the radial direction of the blade. The slots 22 thus do not become packed full of sawdust, nor do they shave any wood from the lumber being sawn.

My saw runs cooler than saws known heretofore. The slots increase the exposed area of the saw and result in a radiator effect where the metal is cut. The saw thus runs and cuts cooler.

My saw runs more quietly than saws known heretofore. The presence of the slots results in an air gap between the metal. The resulting noncontinuous metal body portion buffers noise traveling from the rim. Also, as vibrations are produced in the mandrel, the noise thereof is dissipated, thereby reducing saw plate vibrations and resulting in less weaving. My saw blade thus runs and cuts more quietly than saw blades known heretofore.

My saw blade has better heat dissipation from the body plate than do saws of the prior art. The slots permit expansion and contraction due to heating of the blade and cooling thereof without resulting in any undue stress on the blade. The slots function much like expansion joints in concrete or like gaps that are built into steel bridges to permit the metal to expand and contract, thereby relieving the structural steel from thermal stresses.

My saw blade runs straighter than do those of the prior art. As in any rotating body, centrifugal forces in a rotating body increase generally proportionally to the distance from the center of rotation. Placing the slots in a circular pattern permits movement of the material in the body generally radially outwardly from the center. This results in a saw blade that can flatten itself better as it cuts.

My saws are also easy to hammer. When a filer strikes a saw, the metal has to go somewhere. The circular slots not only absorb the hammer blows, but they also allow the metal to expand.

Operation of my saw has demonstrated that the arcuate slots do not result in any sawdust packing as was the case with the Jansen-Herfeld blade. The result is that lumber is not damaged as it is cut.

My saw blade does not weave due to lack of tension as much as other saws do. It can thus be run in guided saws. It will work on guided edges. The circumferentially extending slots help cool the saw better due to their improved heat radiation. Also, since none of the slots extends from the central bore, the blade is provided with a solid steel area around the mandrel which is stronger than the Jansen-Herfeld blade.

My saw blade recovers from running hot better than does a solid (uncut) saw blade and better than the Jansen-Herfeld blade. My saw has a resilience which the other saws do not. My saw can take more heating than can a solid plate saw.

My saw is much more resistant to cracking than are prior art saws. This is probably due to the stress release provided by the circumferentially extending slots.

My saws are easy to hammer compared to a solid plate saw. My saws achieve reduced metal fatigue and stress due to their flexibility at the slots.

The fact that the slots 22 in my saw are circumferentially extending achieves many advantages that are not possible in saws where the slots are radially extending as, for example, in the Jansen-Herfeld blade. The area of greatest stress in a saw blade is at the peripheral edge. This is due to the friction caused by the teeth as they shear the wood and also from the centrifugal force which as aforesaid is generally proportional to the distance from the center of the mandrel. These stresses are eliminated in my saw because some of the circumferentially extending slots are located in the outer areas of the body of the blade. Compare the Jansen-Herfeld saw blade where the slots radiate from the central bore which is the area of the blade having the least stress.

The circumferentially extending slots in my blade permit a heaving action on the rim due to their circumferential nature. The Jansen-Herfeld blade with its slots extending outwardly from the central bore does not allow such heaving to occur. The Jansen-Herfeld blade with its slots radiating from the center therefore cannot buffer waves, but on the contrary allows them to continue their outward movement.

The circumferentially extending cuts in my saw blade act as a maze for noise, heat, vibrations, etc., which move from the rim or from the mandrel. Noise, heat and vibrations move in wave-like forms. The circumferentially extending slots in my blade act as buffers that trap these undesirable waves. The slots dissipate the waveform and the reduced wave is further reduced as it approaches radially successive slots. My saw blade is substantially deader than a similar solid plate saw. This can be demonstrated when both blades are hit with a hammer. The dullness of the sound emanating from my blade indicates sound absorption.

Comparing my saw blade with the Jansen-Herfeld blade:

| Carter Saw Blade | Jansen-Herfeld Saw Blade |
| --- | --- |
| Quiet | Noisy |
| Runs cool | Runs hot |
| Runs longer | Short running life |
| Hard to crack | Cracks easily |
| No sawdust packing in slots | Sawdust packs in slots |
| Does not damage lumber | Does damage lumber |
| Does not damage guides | Does damage guides |
| Recovers from running hot | Does not recover easily from running hot |
| Runs straighter | Weaves |
| Will run in gap edges, guided or unguided | Will not run in gap edges of any form |
| Strong in the mandrel area | Weak around the mandrel area due to the radiating slots |

My saws run more smoothly and more efficiently than do either Jansen-Herfeld saw blades or solid plate blades. This results in less cost for electricity, less saw down time, less labor and time required in hammering, and improved safety. My saw blades have had no cracks, unusual loss of tension, unusual loss of teeth, or damage of any kind. They have performed in a superior manner to any other saw blade with which I am familiar.

While my invention has been illustrated and described as aforesaid, it is not intended to be limited to the details shown, since various modifications and changes may be made without departing in any way from the spirit of the invention.

I claim:

1. A circular saw blade, comprising a circular body with two side faces, the body comprising a central bore and a toothed peripheral edge and
   a plurality of circumferentially extending laser-cut slots disposed within the body, each of the slots consisting of an arc of a circle concentric with the body and parallel to the peripheral edge thereof, each of the slots extending through the body from one side face to the other, the slots being spaced wherein each slot cools an area of the body when the saw blade is cutting, whereby the entire circumference of said body is substantially equally relieved of stress through said slots.

2. A circular saw blade as in claim 1 wherein the slots are between about 0.002 inch and 0.015 inch in width.

3. A circular saw blade as in claim 1 wherein a plurality of the slots consist of arcs of a single circle concentric with the body and parallel to the peripheral edge thereof.

* * * * *